United States Patent [19]

Mierzwa

[11] Patent Number: 4,524,881
[45] Date of Patent: Jun. 25, 1985

[54] CAP FOR A TANK

[75] Inventor: Dietmar Mierzwa, Korb, Fed. Rep. of Germany

[73] Assignee: Andreas Stihl, Waiblingen, Fed. Rep. of Germany

[21] Appl. No.: 640,697

[22] Filed: Aug. 14, 1984

[30] Foreign Application Priority Data

Aug. 30, 1983 [DE] Fed. Rep. of Germany ... 8324849[U]

[51] Int. Cl.³ .............................................. B65D 51/16
[52] U.S. Cl. .................................................... 220/374
[58] Field of Search ............... 220/373, 367, 374, 366; 137/587, 43, 589

[56] References Cited

U.S. PATENT DOCUMENTS 3,983,891 10/1976 Shoemaker ........................ 220/374
4,392,584 7/1983 Bauer .................................. 220/374

Primary Examiner—George T. Hall
Attorney, Agent, or Firm—Walter Ottesen

[57] ABSTRACT

The invention is directed to a cap for a tank such as the fuel tank of a motor-driven chain saw or the like and includes a grip housing. The grip housing threadably engages a tank opening when rotated about its central axis whereby a seal lying transversely to the central axis is pressed against an end face of the tank opening. The grip housing includes a ventilating arrangement having a screw screwed into a bore to define a helical air channel. The air channel is bounded by the wall of the bore and the thread of the screw. The bore and the screw are arranged in the grip housing so that they are aligned transversely to the central axis of the grip housing.

14 Claims, 2 Drawing Figures

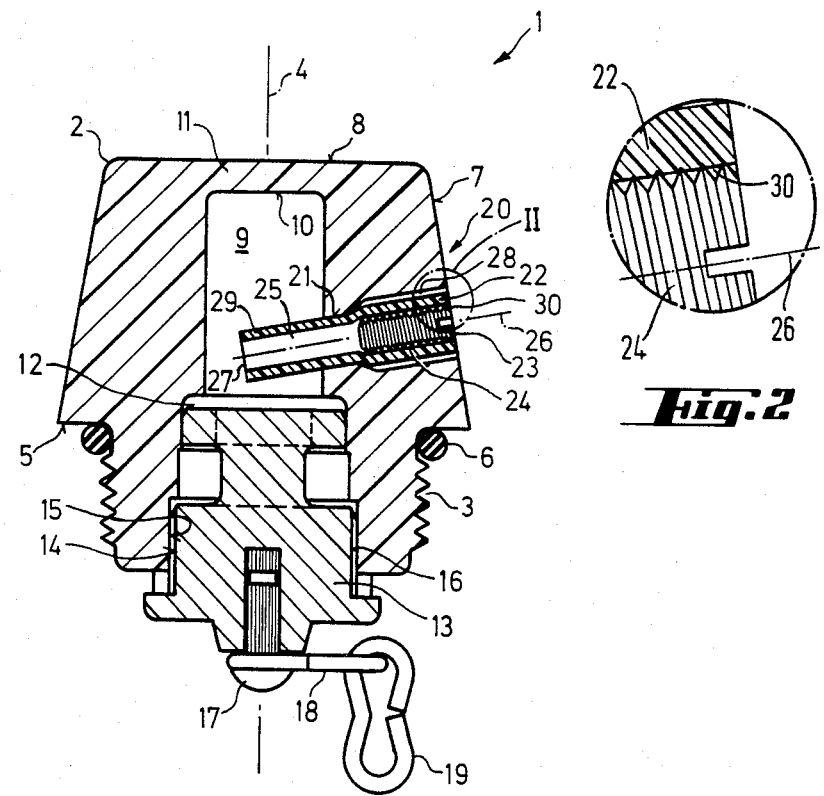

CAP FOR A TANK

FIELD OF THE INVENTION

The invention relates to a cap for a tank such as for a fuel tank of a motor-driven chain saw or the like. The cap includes a grip housing which is pressed with a seal against a sealing surface about the periphery of a tank opening when rotated about a central axis of the cap. The cap includes a ventilating arrangement for permitting air to pass into and out of the tank.

BACKGROUND OF THE INVENTION

A known cap of the kind described above includes a grip housing on which a sealing ring is supported. The grip housing includes a threaded stub which threadably engages a thread of a tank opening when rotated about the central axis of the grip housing whereby the seal is pressed against an end face of the tank opening so that a tight closure is provided.

A ventilating arrangement is provided in order to equalize the pressure in the tank and is mounted in the grip housing so as to be coaxial with respect to the central axis thereof. With this arrangement, the opening of the ventilating arrangement is almost always substantially horizontal on the upper surface of the grip housing so that there is a danger that the ventilating arrangement will become blocked by chips or other dirt particles which can become lodged at the region of the opening on the upper surface.

SUMMARY OF THE INVENTION

It is an object of the invention to provide a cap for a tank wherein blockage of the ventilating opening is prevented and which provides a trouble free ventilation of the tank even in the presence of a great amount of dirt in the outer surrounding region of the ventilating opening.

In a preferred embodiment, the cap of the invention is for a tank having a threaded opening with a sealing surface about the periphery thereof. The cap includes a grip housing defining a central axis and having a thread formed thereon for threadably engaging the threaded opening of the tank. A seal is mounted on the grip housing in a plane transverse to the central axis so as to be pressed tight to the sealing surface when the grip housing is rotated about its central axis in threaded engagement with the threaded opening of the tank. A ventilating arrangement conducts air into and out of the tank when the cap is mounted thereon. The ventilating arrangement includes bore means defining a longitudinal axis and located in the grip housing so as to cause the longitudinal axis to be transverse to the central axis. The bore means has a wall surface disposed in spaced relationship to the longitudinal axis. A threaded member has a longitudinal axis and is screwed into the bore means so as to cause the last-mentioned axis to be coincident with the longitudinal axis of the bore means. The wall surface and the thread of the threaded member conjointly define a helical channel communicating with the interior of the tank when the cap is mounted thereon whereby air can flow into or out of the interior of the tank.

BRIEF DESCRIPTION OF THE DRAWING

The invention will now be described with reference to the drawing wherein:

FIG. 1 is an elevation view, partially in section, showing the cap for a tank according to the invention; and, FIG. 2 is an exploded view of the circled portion II of FIG. 1 and shows the threaded screw defining a helical air channel communicating with a cavity within the cap.

DESCRIPTION OF THE PREFERRED EMBODIMENTS OF THE INVENTION

The cap 1 includes a grip housing 2 made of plastic which includes a stub 3 integral therewith and upon which a thread is formed so that when the grip housing 2 is rotated about the central axis 4, the thread on the stub 3 engages the inner winding of a tank opening. The tank opening is arranged on the tank so that it is directed in substantially the upward direction. A seal 6 is supported at a substantially horizontal mid peripheral surface 5 of the grip housing 2 and is pressed against the end face of the tank opening so that a tight seal is provided when the cap is secured to the tank.

The outer surface 7 of the grip housing 2 has a truncated conical configuration such that the grip housing 2 tapers inwardly from the mid peripheral surface 5 in the direction of the top surface 8.

A cavity 9 is formed in the grip housing 2 at the region of the central axis 4 and has a base 10 defined by the upper wall 11 of the grip housing 2. The cavity 9 includes an upper portion 31 and a lower portion 12. The lower portion 12 is spaced away from the base 10 and is wider than the upper portion 31.

An insert body 13 is supported in the lower cavity portion 12. The insert body 13 has an upper portion 32 which is in press-fit engagement with wall surface 33 of cavity portion 12. The upper portion has recesses or cutouts formed therein which permit the passage of air between the portion 31 of cavity 9 above the insert body 13 and the air gap 16 referred to below. The recesses are represented in the drawing by the vertical broken lines 34.

The insert body 13 is further configured so that an air gap 16 is formed between the outer peripheral surface 14 of the insert body 13 and the inner wall 15 of the enlarged cavity portion 12 thereby providing a connecting space to permit the passage of air to the upper portion 31 of cavity 9 from the interior of the tank.

An annular connecting part 19 is connected to the lower end of the insert body 13 via a bolt 17 and an intermediate piece 18. A securing chain (not shown) or the like can be connected to the connecting part 19 and would be preferably dimensioned in length to allow the cap 1 to be threadably disengaged from the tank opening to permit the tank to be filled and yet prevent the cap from becoming entirely separated from the tank. Accordingly, the cap 1 is held to the tank so that it cannot be misplaced or lost. Preferably, the insert body 13 and/or the connecting part 19 can be attached to the grip housing 2 so as to be rotatable about the central axis 4 thereby permitting the grip housing 2 to be rotated in the winding of the tank opening without the chain becoming twisted about itself.

A ventilating arrangement 20 is provided in the region above the stub 3 and includes a tubular section 22 and a screw 23. The screw 23 is screwed with its thread 24 into bore 25 of the tubular section 22. The ventilating arrangement 20 is supported in a form-tight manner in a transverse bore 21 of the grip housing 2. The ventilating arrangement 20 is thereby aligned with its longitudinal axis 26 so that the latter is transverse to the central axis 4 of the grip housing 2. The end region 27 of the tubular section 22 thereby projects transversely into the cavity 9. The tubular section 22 is preferably configured as a section of plastic hose.

The transverse bore 21 in the grip housing 2 is configured as a stepped bore. The portion of the bore 21 having the smaller diameter is so dimensioned that the tubular section 22 is pressed into the grip housing 2. The transverse bore 21 has a wider diameter at the region 28 of the tubular section 22 whereat the screw 23 is disposed. The tubular section 22 can widen in the region of the wider portion 28 when the screw 23 is screwed in so that in every instance it is assured that an air channel 30 will be present and conjointly defined by the inner wall 29 of the tubular section 22 and the thread 24 of the screw 23. The air channel 30 extends in helical fashion about the screw 23 in correspondence to the pitch of the thread 24.

The longitudinal axis 26 of the ventilating arrangement 20 is precisely perpendicular to the tapered outer surface 7 of the grip housing 2. In addition, the longitudinal axis 26 of the ventilating arrangement 20 defines a small acute angle with respect to the plane of the surface 5 such that it is approximately parallel thereto. Furthermore, the ventilating arrangement 20 is arranged in the grip housing 2 so that an angle facing upwardly toward the top surface 8 of almost 90° is defined by the longitudinal axis 26 and the central axis 4.

The tubular section 22 is preferably made of plastic so that a portion of the tubular section 22 has the capability of expanding in the region 28 of the transverse bore 21 whereat the latter has a widened diameter and the screw 23 is disposed. Accordingly, the screw 23 causes tubular section 22 to expand and fill out the segment 28 of the bore 21 whereby the additional advantage is obtained that the tubular section 22 is held still tighter in the transverse bore 21 of the grip housing 2.

A still further advantage of the invention is obtained by mounting the ventilating arrangement 20 transverse to the vertical central axis 4 of the grip housing 2 so that the opening of the ventilating arrangement 20 at the outer surface 7 of the grip housing 2 is always free and cannot become blocked with dirt since small chips and other dirt particles cannot become lodged at the arrangement 20 of the invention.

It is understood that the foregoing description is that of the preferred embodiments of the invention and that various changes and modifications may be made thereto without departing from the spirit and scope of the invention as defined in the appended claims.

What is claimed is:

1. A cap for a tank such as the fuel tank of a motor-driven chain saw or the like, the tank having a threaded opening with a sealing surface about the periphery thereof, the cap comprising:
   a grip housing defining a central axis and having a thread formed thereon for threadably engaging the threaded opening of the tank;
   a seal mounted on the grip housing in a plane transverse to said central axis so as to be pressed tightly to the sealing surface when said grip housing is rotated about its central axis in threaded engagement with the threaded opening of the tank; and,
   a ventilating arrangement for conducting air into and out of the tank when the cap is mounted thereon, the ventilating arrangement including:
   bore means defining a longitudinal axis and located in said grip housing so as to cause said longitudinal axis to be transverse to said central axis, said bore means having a wall surface disposed in spaced relationship to said longitudinal axis;
   a threaded member having a longitudinal axis and screwed into said bore means so as to cause said last-mentioned axis to be coincident with the longitudinal axis of said bore means; and,
   said wall surface and the thread of said threaded member conjointly defining a helical channel communicating with the interior of the tank when the cap is mounted thereon, whereby air can flow into or out of the interior of the tank.

2. The cap of claim 1, said bore means and said threaded member being arranged in said grip housing so as to cause said longitudinal axis and said central axis to conjointly define an angle of approximately ninety degrees.

3. The cap of claim 1, said bore means and said threaded member being disposed in said grip housing so as to cause said longitudinal axis to be approximately parallel to the plane of said sealing ring.

4. The cap of claim 1, said grip housing having an outer peripheral surface disposed in surrounding relationship to said central axis; said bore means and said threaded member being disposed in said grip housing so as to cause said longitudinal axis to be perpendicular to said peripheral surface.

5. The cap of claim 1, said bore means including: a bore extending into said grip housing transversely to said central axis; and, a tubular section for receiving said threaded member therein, said tubular section being supported in said bore in a form-tight manner.

6. The cap of claim 5, said tubular section being a section of plastic hose.

7. The cap of claim 1, said bore means including: a stepped bore having a first segment and a second segment wider than said first segment; and, a tubular section for receiving said threaded member therein, said tubular section being supported in said bore and said threaded member being disposed in the portion of said tubular section within said second segment.

8. The cap of claim 1, comprising cavity means formed in said grip housing so as to communicate with the interior of the tank when said cap is mounted thereon; and,
   said bore means including: a bore extending into said grip housing transversely to said central axis; and, a tubular section for receiving said threaded member therein, said tubular section being supported in said bore in a form-tight manner so as to cause the same to project into said cavity means.

9. The cap of claim 8, said cavity means being a stepped bore having a base and a bore segment spaced from said base; and, said cap further comprising an insert body supported in said bore segment and having a peripheral surface adjacent the surface of said bore segment to conjointly define therewith an air gap communicating with said tubular section.

10. The cap of claim 9, said insert body including mounting means for holding a securing chain or the like adapted for attachment to the tank.

11. A cap for covering the opening of a tank, the cap comprising:
   a grip housing defining a central axis and having means thereon for engaging the tank at the opening thereof;

cavity means formed in said grip housing so as to communicate with the interior of the tank when said cap is mounted thereon; and, a ventilating arrangement for conducting air into and out of the tank when the cap is mounted thereon, the ventilating arrangement including:

bore means defining a longitudinal axis and located in said grip housing so as to cause said longitudinal axis to be transverse to said central axis, said bore means communicating with said cavity means and having a wall surface disposed in spaced relationship to said longitudinal axis;

a threaded member having a longitudinal axis and screwed into said bore means so as to cause said last-mentioned axis to be coincident with the longitudinal axis of said bore means; and, said wall surface and the thread of said threaded member conjointly defining a helical channel communicating with the interior of the tank via said cavity means when the cap is mounted thereon whereby air can flow into or out of the interior of the tank.

12. The cap of claim 11, said bore means including: a stepped bore having a first segment and a second segment wider than said first segment; and, a tubular section for receiving said threaded member therein, said tubular section communicating with said cavity means and being supported in said bore; and, said threaded member being disposed in the portion of said tubular section within said second segment.

13. The cap of claim 12, said tubular section being press-fitted into said bore so as to be firmly held in said first segment thereof, said tubular section being made of plastic and receiving said threaded member therein at the region thereof disposed in said second segment of said stepped bore, the diameter of said threaded member and the diameter of said second segment being selected so as to cause said plastic tubular section to expand in said second segment thereby causing said tubular section to seat snugly in said second segment.

14. The cap of claim 11, said grip housing having an outer peripheral surface disposed in surrounding relationship to said central axis; said bore means and said threaded member being disposed in said grip housing so as to cause said longitudinal axis to be perpendicular to said peripheral surface.

* * * * *